United States Patent
Aikawa et al.

(10) Patent No.: US 8,041,354 B2
(45) Date of Patent: Oct. 18, 2011

(54) MOBILE SWITCHBOARD, MOBILE UNIT, MOBILE COMMUNICATION SYSTEM, AND POSITION-REGISTRATION EXTENDING METHOD

(75) Inventors: Shinichiro Aikawa, Kawasaki (JP);
Yoshiko Koizumi, Kawasaki (JP);
Yukihiro Noda, Kawasaki (JP); Yoko Shimominami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/508,282

(22) Filed: Jul. 23, 2009

(65) Prior Publication Data

US 2009/0286537 A1 Nov. 19, 2009

Related U.S. Application Data

(60) Division of application No. 11/090,913, filed on Mar. 24, 2005, which is a continuation of application No. PCT/JP03/04026, filed on Mar. 28, 2003.

(51) Int. Cl.
*H04W 4/00* (2009.01)
*H04W 24/00* (2009.01)

(52) U.S. Cl. ............... 455/435.1; 455/432.1; 455/456.5; 455/456.6

(58) Field of Classification Search ............... 455/435.1, 455/435.2, 432.1, 456.1, 456.5, 456.6
See application file for complete search history.

(56) References Cited

U.S. PATENT DOCUMENTS

| | | | |
|---|---|---|---|
| 5,212,822 A | 5/1993 | Fukumine et al. | |
| 5,898,923 A * | 4/1999 | Gaasvik et al. | 455/434 |
| 6,510,318 B1 * | 1/2003 | Minagawa | 455/435.2 |
| 6,675,014 B1 | 1/2004 | Sundquist | |
| 7,181,211 B1 | 2/2007 | Phan-Anh | |
| 2003/0040314 A1 | 2/2003 | Hogan et al. | |
| 2003/0190914 A1 | 10/2003 | Shimbori | |

FOREIGN PATENT DOCUMENTS

| | | |
|---|---|---|
| JP | 3-80790 | 4/1991 |
| JP | 3-131131 | 6/1991 |
| JP | 5-68004 | 3/1993 |
| JP | 7-87554 | 3/1995 |
| JP | 7-250365 | 9/1995 |
| JP | 8-51661 | 2/1996 |
| JP | 8-065736 | 3/1996 |
| JP | 11-196452 | 7/1999 |
| JP | 2000-23234 | 1/2000 |
| JP | 2000-134662 | 5/2000 |
| JP | 2000-316179 | 11/2000 |
| JP | 2002-142243 | 5/2002 |
| JP | 2003-512794 | 4/2003 |

OTHER PUBLICATIONS

International Search Report dated Jul. 29, 2003, from the corresponding International Application.
Notice of Rejection dated Dec. 11, 2007, from the corresponding Japanese Application.
United States Office Action dated Dec. 13, 2007.

(Continued)

*Primary Examiner* — Un C Cho
(74) *Attorney, Agent, or Firm* — Katten Muchin Rosenman LLP

(57) ABSTRACT

A mobile unit transmits a request for position registration to a network when moving from a first area to a second area. When the number of incoming calls does not exceed a threshold and the number of movements between the first area and the second area exceeds a threshold, a mobile switchboard combines the first area and the second area into an extended area, and informs the mobile unit of the extended area.

16 Claims, 12 Drawing Sheets

OTHER PUBLICATIONS

United States Office Action dated Jun. 27, 2008.
United States Office Action dated Jan. 23, 2009.
United States Office Action dated Jun. 22, 2010, from corresponding U.S. Appl. No. 11/090,913.

* cited by examiner

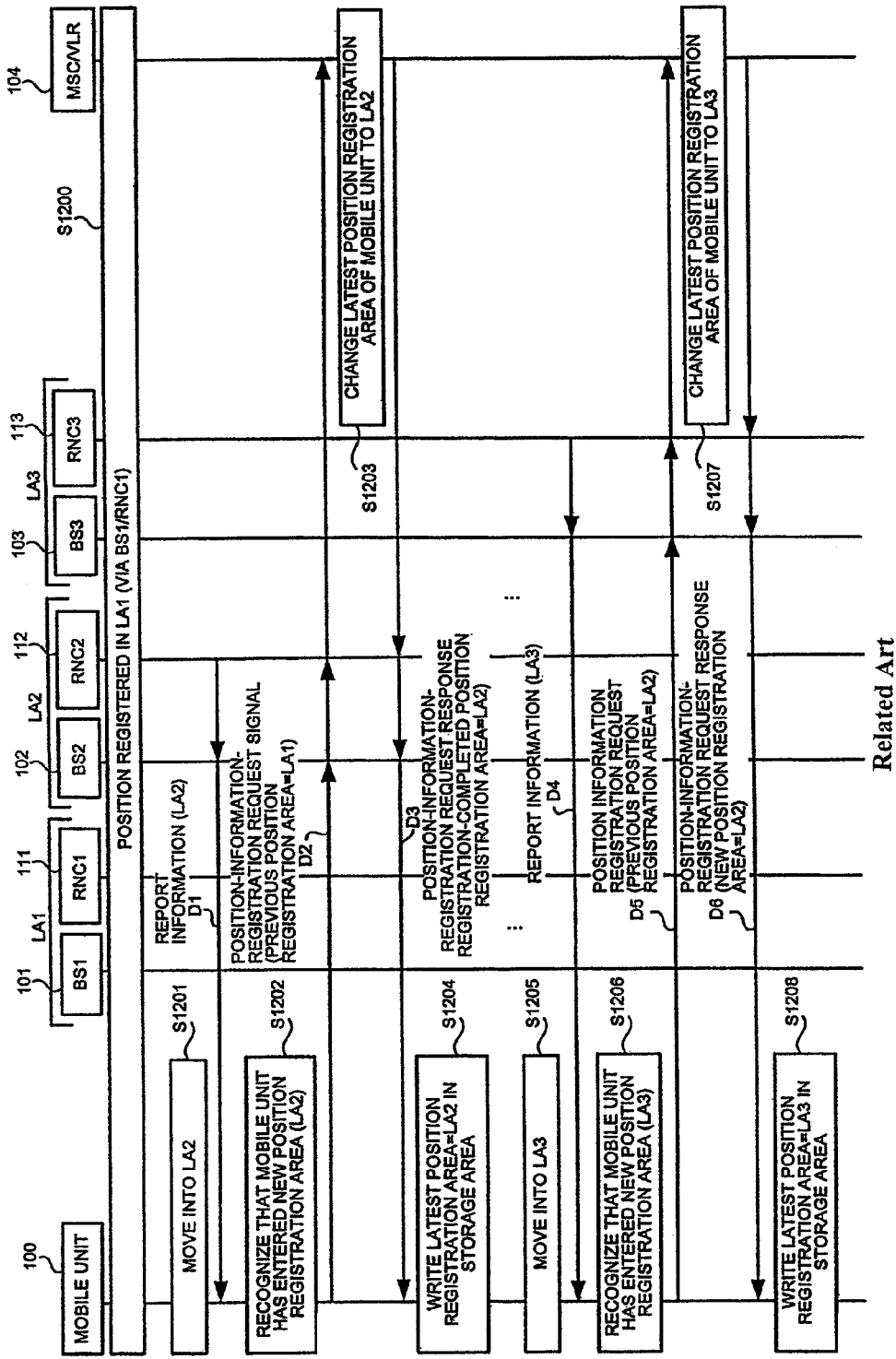

MOBILE SWITCHBOARD, MOBILE UNIT, MOBILE COMMUNICATION SYSTEM, AND POSITION-REGISTRATION EXTENDING METHOD

BACKGROUND OF THE INVENTION

1) Field of the Invention

The present invention relates to a technology for registration of a position of a mobile unit in a mobile communication network.

2) Description of the Related Art

A mobile communication system is configured with a mobile unit (UE), a base-station control device (RNC), a base station (BS), a mobile switchboard (MSC), and a location register (VLR) that is provided in the mobile switchboard and in which information on a position of the mobile unit is registered. The position of the mobile unit always changes in the mobile communication system. Therefore, registration of the position of the mobile unit in advance of an incoming call is a required management for the network (mobile switchboard) to establish communication upon receiving the incoming call.

Specifically, the position is managed as a part of subscriber information in the location register by using sections locally divided called position registration areas. The same information of the position registration area is registered in the mobile unit. The registration of the position at the mobile unit is carried out by the mobile unit requesting the network when the mobile unit is powered on and when the mobile unit not during communication moves across position registration areas.

In recent years, with the increasing number of users of the mobile communication system, the amount of data on the network has been increasing accordingly. However, wireless resources between the mobile unit and the base station in the network are limited. Therefore, various methods have been studied for efficient use of such wireless resources.

In a conventional position registering method, for example, the position of the mobile unit is registered every time the mobile unit moves across position registration areas. To determine an area to which a paging signal for an incoming call is to be sent, the network always ascertains a current area in which the mobile unit is located.

FIG. 12 is a sequence diagram of a conventional position registration procedure for the mobile unit. It is assumed that three position registration areas LA1, LA2, and LA3 are present.

As shown in FIG. 12, first, (1) a mobile unit 100 is located in the position registration area LA1, and this position registration area LA1 is registered in a location register VLR in a mobile switchboard (MSC) 104 via a base station 101 and a base-station control device (RNC1) 111 (step S1200).

Next, (2) when the mobile unit 100 moves to another area, the position registration area LA2 (step S1201), the mobile unit 100 recognizes that the mobile unit 100 has entered the position registration area LA2 based on report information D1 of the current area (step S1202). Then, a position-information-registration request D2 for which a previous area, the position registration area LA1, is set is transmitted to the location register VLR via a base station (BS2) 102 and a base-station control device (RNC2) 112.

Next, (3) upon receiving the position-information-registration request D2, the mobile switchboard 104 recognizes that the mobile unit 100 is located in the position registration area LA2, and updates a latest position registration area in the location register VLR to the position registration area LA2 (step S1203). Then, the mobile switchboard 104 returns a position-information-registration request response D3 to the mobile unit 100 to notify that the latest position registration area is LA2.

Next, (4) upon receiving the position-information-registration request response D3, the mobile unit 100 recognizes completion of position registration, and then, writes and stores the position registration area LA2 in a storage area for position information in the mobile unit 100 as the latest position registration area (step S1204).

Next, (5) when the mobile unit 100 moves to the position registration area LA3 (step S1205), the mobile unit 100 recognizes, based on report information D4 of a current area, that the mobile unit 100 has entered another area, the position registration area LA3 (step S1206). Then, the position registration procedure is performed in a similar manner as a case of the position registration area LA2. First, a position-information-registration request D5 for which a previous area, the position registration area LA2, is set is transmitted to the location register VLR via a base station (BS3) 103 and a base-station control device (RNC3) 113.

Next, (6) upon receiving the position-information-registration request D5, the mobile switchboard 104 recognizes that the mobile unit 100 is located in the position registration area LA3, and then updates the latest position registration area to LA3 (step S1207). Then, the mobile switchboard 104 returns a position-information-registration request response D6 to the mobile unit 100 to notify that the latest position registration area is LA3.

Next, (7) upon receiving the position-information-registration request D6, the mobile unit 100 recognizes completion of position registration, and then, writes and stores the position registration area LA3 in the storage area as the latest position registration area (step S1208).

As described above, when the mobile unit 100 changes its location from the position registration area LA1 to the position registration area LA2, the mobile unit 100 performs the position registration procedure on the network. Thus, the position information in the mobile unit 100 and the location register VLR is updated to the position registration area LA2. In this manner, when there is an incoming call for the mobile unit 100, paging is performed with respect to the position registration area LA2. In a similar manner, when the mobile unit 100 changes its location to another area, for example, the position registration area LA3, the position information is updated to the position registration area LA3.

As described, in the conventional mobile communication, the location of the mobile unit is kept track of in a unit of position registration area that includes a plurality of base stations. Update of this position registration area is important for accurately grasping the position registration area when an incoming call is to be placed to the mobile unit in the network. Such technologies regarding the update of the position registration area are disclosed in, for example, Japanese Patent Laid-Open Publication No. H7-87554, Japanese Patent Laid-Open Publication No. H7-250365, and Japanese Patent Laid-Open Publication No. 2000-23234.

However, in the conventional technologies, the wireless resources in the network are wasted. In the conventional technologies, every time the mobile unit moves across position registration areas, a process of updating the position registration information is performed irrespectively of frequency of the incoming-call. Therefore, when the mobile unit frequently moves near a boundary of position registration areas, the process is performed very frequently because the process is performed every time the mobile unit enters one of the position registration areas. Particularly, frequent performance of such process by a mobile unit with a low incoming-call frequency leads to a wasteful use of the wireless resources, and makes it impossible for the wireless resources to be used efficiently.

SUMMARY OF THE INVENTION

It is an object of the present invention to solve at least the above problems in the conventional technology.

A mobile switchboard according to one aspect of the present invention includes an incoming-call recording unit that records number of incoming calls to a mobile unit, which is movable between a plurality of position registration areas, the number of incoming calls within a predetermined time period; a movement recording unit that records, every time the mobile unit changes a location to a first area that is one of the position registration areas, a moving condition of the mobile unit, the moving condition of movement between the first area and a second area that is one of the position registration areas and in which the mobile unit has previously been located; and an area extending unit that extends a position registration area to form a third area by combining the first area and the second area, that records the third area in the movement recording unit, and that informs the mobile unit of the third area. The area extending unit determines whether to combine the first area with the second area based on the number of incoming calls and the moving condition, and the area extending unit extends the position registration area when it is determined to combine the first area with the second area.

A mobile unit according to another aspect of the present invention performs communication in a plurality of position registration areas in a network that includes a mobile switchboard that manages position information of the mobile unit and that performs switching control of incoming and outgoing calls for the mobile unit, and includes an area recording unit that records a first area that is one of the position registration areas and to which the mobile unit moves to change a location and a second area that is one of the position registration areas and in which the mobile unit has previously been located; and a registration requesting unit that requests the mobile switchboard for registration of the first area. The area recording unit combines the first area and the second area, and records the first area and the second area combined when the switchboard notifies the mobile unit of completion of the registration that is performed in accordance with the request from the registration requesting unit, and the registration requesting unit requests the registration only when the first area is a new area that is one of the position registration areas and that has not been recorded in the area recording unit.

A mobile communication system according to still another aspect of the present invention includes a mobile unit that is communicable while moving within a plurality of position registration areas in a network; and a mobile switchboard that manages position information of the mobile unit and that performs switching control of incoming and outgoing calls for the mobile unit. The mobile switchboard includes an incoming-call recording unit that records number of incoming calls to the mobile unit within a predetermined time period; a movement recording unit that records, every time the mobile unit changes a location to a first area that is one of the position registration areas, a moving condition of the mobile unit, the moving condition of movement between the first area and a second area that is one of the position registration areas and in which the mobile unit has previously been located; and an area extending unit that extends a position registration area to form a third area by combining the first area with the second area, that records the third area in the movement recording unit, and that informs the mobile unit of the third area. The area extending unit extends the position registration area when the number of incoming calls does not exceed a predetermined threshold and the number of movements between the position registration areas within a predetermined time period exceeds a predetermined threshold. The mobile unit includes an area recording unit that records the third area that is notified by the mobile switchboard; and a registration requesting unit that requests the mobile switchboard for registration of the first area. The registration requesting unit requests the registration only when the first area is a new area that is one of the position registration areas and that has not been recorded in the area recording unit.

A method according to still another aspect of the present invention is a method for extending position registration in a mobile switchboard that communicates with a mobile unit, that manages position information of the mobile unit, and that performs switching control of incoming and outgoing calls for the mobile unit, and includes recording number of incoming calls to the mobile unit within a predetermined time period; recording, every time the mobile unit changes a location to a first area that is one of the position registration areas, a moving condition of the mobile unit, the moving condition of movement between the first area and a second area that is one of the position registration areas and in which the mobile unit has previously been located; and extending a position registration area to form a third area, when the number of incoming calls does not exceed a predetermined threshold and number of movements within a predetermined time period exceeds a predetermined threshold. The extending includes combining the first area and the second area; and notifying the mobile unit of the third area.

A method according to still another aspect of the present invention is a method for extending position registration in a mobile unit that moves in a plurality of position registration areas in a network, with which the mobile unit requests a mobile switchboard that manages position information that relates to movement of the mobile unit for registration of a position, and includes requesting the mobile switchboard, when the mobile unit changes a location to a first area that is one of the position registration areas, and when the first area is different area from a second area that is one of the position registration areas and in which the mobile unit has previously been located, for registration of the first area, the first area determined to be different from the second area with reference to a record that indicates a position registration area in which the mobile unit has previously been located; and adding, based on a notification of a response from the mobile switchboard to the requesting, the first area to the record.

A method according to still another aspect of the present invention is a method for extending position registration in which a mobile unit moves in a plurality of position registration areas in a network, and position information of the mobile unit is managed by a mobile switchboard, and includes recording position registration areas in which the mobile unit has been located before; recording number of incoming calls to the mobile unit within a predetermined time period; extending a position registration area when the number of incoming calls does not exceed a predetermined threshold and number of movements between the position registration areas within a predetermined time period exceeds a predetermined threshold; and notifying the mobile unit of the third area. The extending includes combining a first area with a second area to form a third area; and recording the third area. The first area is one of the position registration areas and in which the mobile unit moves to change a location. The second area is one of the position registration areas in which the mobile unit has previously been located.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 12 is a sequence diagram of a conventional position registration procedure for a mobile unit.

DETAILED DESCRIPTION

Figure 1:
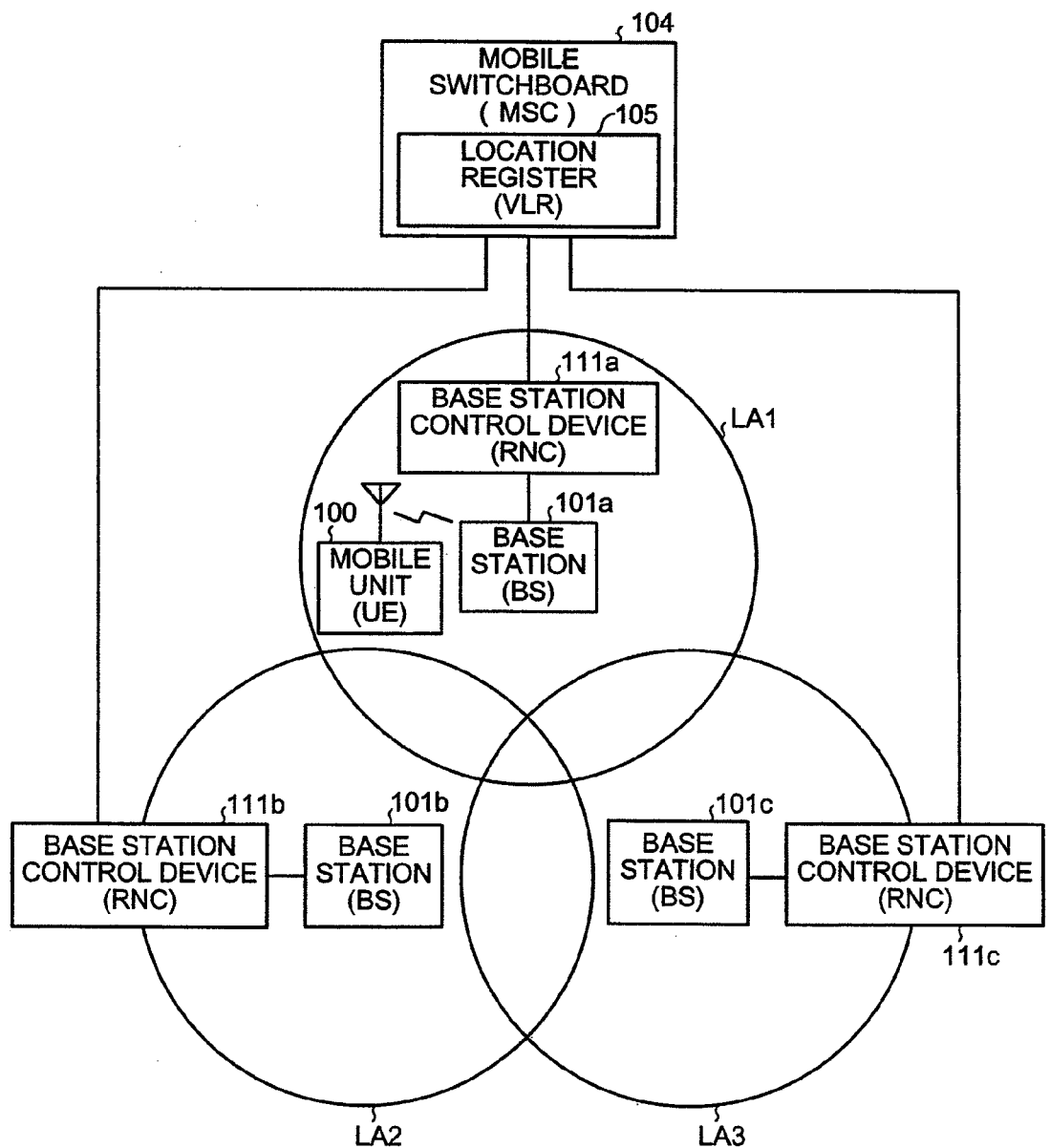
FIG. 1 is a schematic of a mobile-unit communication system according to an embodiment of the present invention.

Exemplary embodiments according to the present invention are explained below in detail with reference to the accompanying drawings. FIG. 1 is a schematic of a mobile-unit communication system according to an embodiment of the present invention. As shown in FIG. 1, the network has a plurality of position registration areas LA1, LA2, and LA3 corresponding to communication service areas. A mobile unit (UE) 100, which is a cellular phone or the like, can make calls while moving within these position registration areas LA1, LA2, and LA3.

The network includes the position registration areas LA1, LA2, and LA3, and also has a plurality of base stations (BS, 101) 101a, 101b, and 101c performing communication (including making calls) with the mobile unit 100 by using a wireless wave, base-station control devices (RNC, 111) 111a, 111b, and 111c connected to the respective base stations 101, and a mobile switchboard (MSC) 104 connected to the base-station control devices 111 to control incoming calls from and outgoing calls to an external relay network (including the mobile unit 100 inside the network). Inside the mobile switchboard 104, a location register (VLR) 105 is provided to register position information of the mobile unit 100. The location register 105 manages, as a part of subscriber information, the position of the mobile unit 100 by using area sections called position registration areas.

The base station 101 controls the mobile unit 100 in the relevant position registration area. The base-station control device 111 has a unit that transmits a report signal to the mobile unit 100 via the base station 101. The mobile unit 100 has a unit that receives report information transmitted from the base-station control device 111 via the base station 101. The report information includes information about the position registration area in which the base station 101 transmitting this report information is included.

The mobile unit 100 has a unit that ascertains, from this position-registration-area information, the position registration area in which the mobile unit is currently present and performs a predetermined position registration process on the location register 105 when the mobile unit moves to a different position registration area. Also, the mobile unit 100 side has a unit that records the same position-registration-area information as that registered in the location register 105.

The mobile switchboard 104 has a unit that issues an incoming-call notification to the mobile unit 100 when an incoming call to the mobile unit 100 under control comes from another network. Upon receiving an incoming-call signal from another network, latest position-registration-area information about the mobile unit 100 stored in the location register 105 is retrieved, and then an incoming-call report is issued by paging via the base-station control device 111 and the base station 101 that corresponding to the latest position registration area to cause the mobile unit 100 to start a process at the time of receiving an incoming call.

Figure 2:
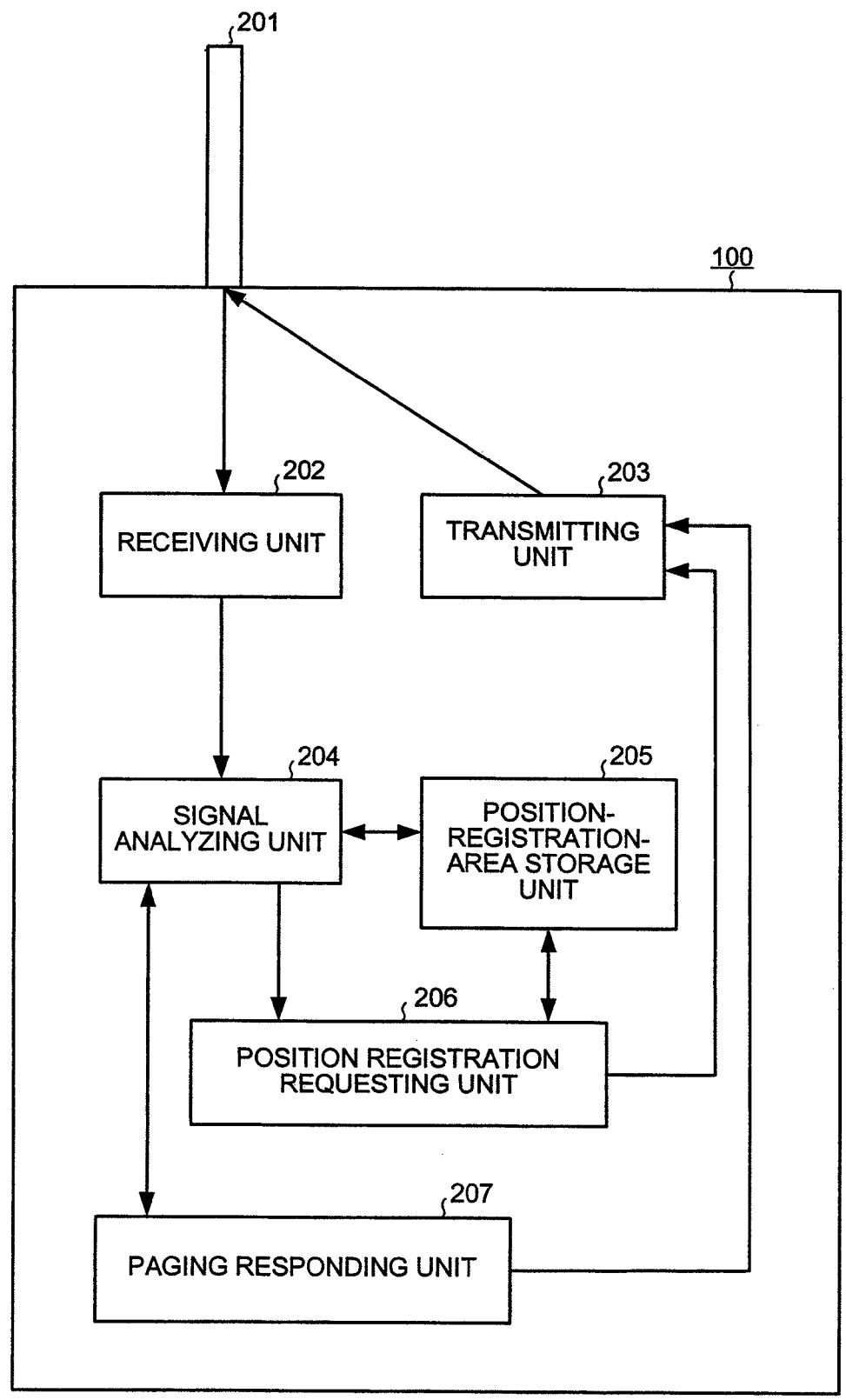
FIG. 2 is a block diagram of a mobile unit.

FIG. 2 is a block diagram of the mobile unit (UE). The mobile unit 100 includes an antenna 210, a receiving unit 202, a transmitting unit 203, a signal analyzing unit 204, a position-registration-area storage unit 205, a position registration requesting unit 206, and a paging responding unit 207. The mobile unit 100 has a function of retaining the position registration area in an extended state.

Figure 3:
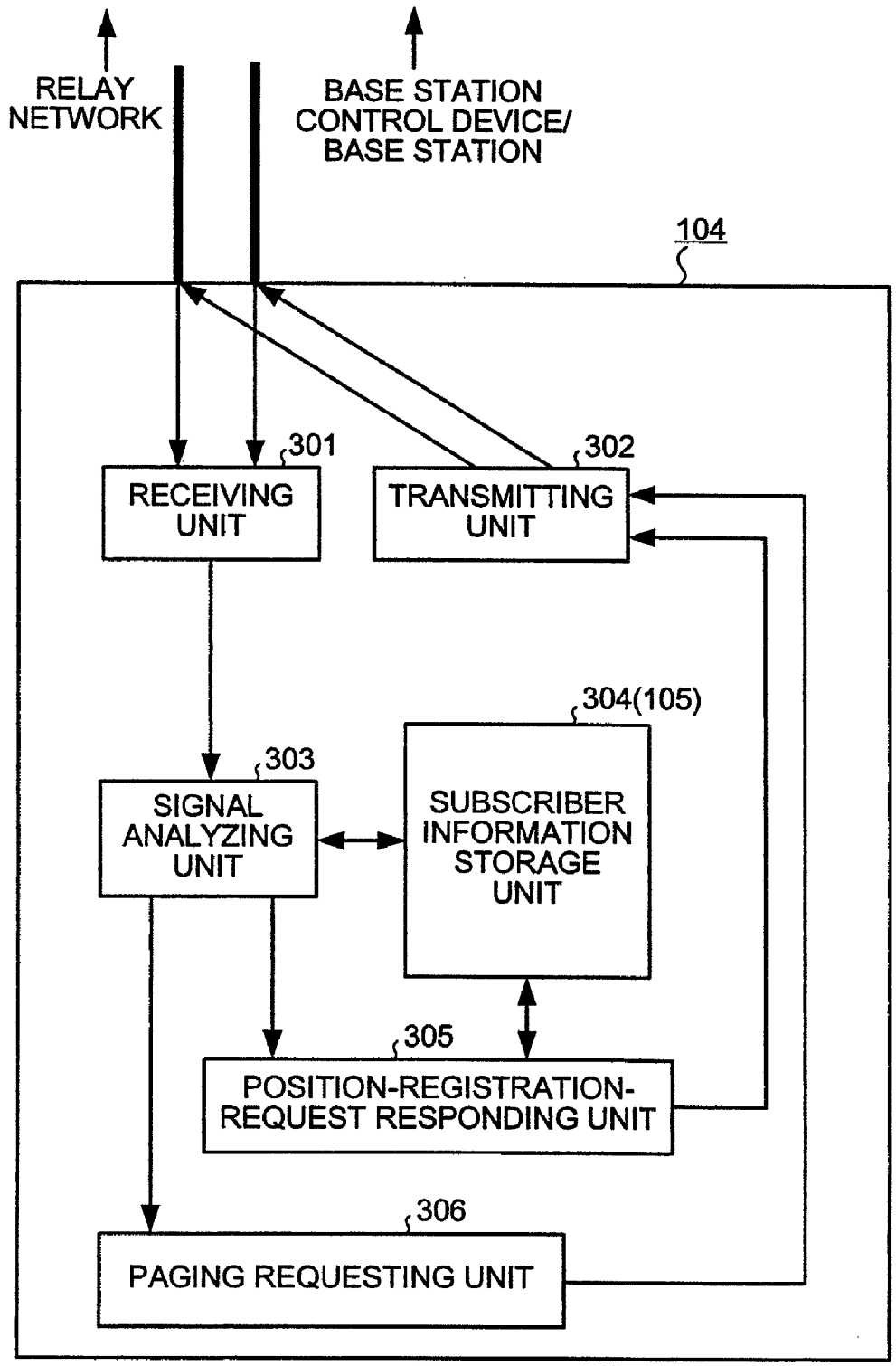
FIG. 3 is a block diagram of a mobile switchboard.

FIG. 3 is a block diagram of the mobile switchboard (MSC). The mobile switchboard 104 receives an incoming call to the mobile unit 100 from an external relay network and transmits an outgoing call from the mobile unit 100 to the external relay network. Also, the mobile switchboard 104 performs network control via the base-station control device RNC over the base station (BS) relevant to the position registration area where the mobile unit 100 is present at the time of receiving an incoming call or transmitting an outgoing call. The mobile switchboard 104 includes a receiving unit 301, a transmitting unit 302, a signal analyzing unit 303, a subscriber-information storage unit 304, a position-registration-request responding unit 305, and a paging requesting unit 306. A part of the subscriber-information storage unit 304 is used as the location register (VLR) 105 to store information about the position registration area. In the following description, it is assumed that the subscriber-information storage unit 304 has a function of the location register 105.

In the present invention, as for a mobile unit 100 with a high moving frequency and a low incoming-call frequency, to reduce the number of times of registering the position of the mobile unit 100, a plurality of position registration areas are connected to each other for storage as a latest position registration area. For example, the mobile unit 100 moves from a previous position registration area LA1 to a new position registration area LA2, connection is made as LA1+LA2. This is referred to as extension of a position registration area. With this, it is not necessary for the mobile unit 100 to always perform a position registration process every time the mobile unit 100 moves across specific position registration areas within a short time. Also, the number of times of position registration performed on the network can be reduced, thereby allowing efficient use of wireless resources on the network. Therefore, each of the mobile unit 100 and the mobile switchboard 104 includes a unit that extends a position registration area and a unit that cancels an extended position registration area.

The subscriber-information storage unit 304 of the mobile switchboard 104 has a function of a movement recording unit that records a movement state of the mobile unit 100 and a function of an incoming-call recording unit. The movement recording unit records, in the subscriber-information storage unit 304, information about a movement of the mobile unit 100 from a position registration area to another position registration area, and a time of the movement. When the mobile unit 100 performs a position registration process, the movement recording unit can ascertain the current position registration area (for example, LA2) based on information added when a position-information-registration request from the mobile unit 100 goes via the base-station control device 111 (information about a correlation between a cell that receives a message and a position registration area of the cell). Also, since the position-information-registration request includes the previous position-registration-area information (for example, LA1), the movement recording unit can ascertain that the mobile unit 100 has moved from one position registration area to another position registration area (for example, a movement from LA1 to LA2), and records the information about the movement to the other position registration area and the time of the movement.

The incoming-call recording unit records the arrival of an incoming call is placed at the mobile unit 100 and the time of the incoming call in the subscriber-information storage unit 304 (location register 105). When the arrival is ascertained at the time of performing incoming-call control over the mobile unit 100 to which an incoming call is placed, the arrival of the incoming call and the time of the arrival are recorded in the subscriber-information storage unit 304 of the mobile switchboard 104.

The signal analyzing unit 303 of the mobile switchboard has a function of a position-registration-area extending unit. This position-registration-area extending unit extends a position registration area of the mobile unit 100 according to the number of incoming calls to the mobile unit 100 and the number of movements of the mobile unit 100. Based on the information recorded by the incoming-call recording unit, the subscriber-information storage unit 304 counts the number of incoming calls to the mobile unit 100 within a predetermined time period, and ascertains that the number of incoming calls does not exceed a predetermined threshold. Then, based on the information recorded by the movement recording unit described above, the number of movements of the mobile unit 100 within a predetermined time period is counted. When the number of movements exceeds a predetermined threshold, the position registration areas across which the mobile unit has moved are connected to each other as a latest position registration area of the mobile unit 100, thereby achieving extension of a position registration area. The position registration areas connected for extension are notified to the mobile unit 100 as a position-registration-completed area of the mobile unit 100.

Also, the signal analyzing unit 303 of the mobile switchboard 104 has a function of an extended-position-registration-area canceling unit (not shown). The extended-position-registration-area canceling unit returns the position registration areas connected for extension to their original separate position registration areas. The subscriber-information storage unit 304 of the mobile switchboard 104 counts the number of incoming calls to the mobile unit 100 within the predetermined time period based on the information recorded by the incoming-call recording unit described above. Then, when the number of incoming call exceeds the predetermined threshold, the extended-position-registration-area canceling unit determines to return the position registration areas connected for extension to their original separate position registration areas. Then, an extended-position-registration cancel notification is issued to the mobile unit 100 at the time of a paging request.

The position-registration-area storage unit 205 of the mobile unit 100 has a function of an extended area storage unit (not shown). This extended area storage unit stores the position registration areas notified at the time of position registration as the position-registration-completed area from the subscriber-information storage unit 304 (location register 105) of the mobile switchboard 104. To the mobile unit 100, the position registration areas connected for extension are notified as the position-registration-completed area by the position-registration-area extending unit of the mobile switchboard 104 described above. This position-registration-completed area is written as the latest position-registration-area information in a storage area of the position-registration-area storage unit 205 of the mobile unit 100. Also, when an extended-position-registration cancel notification comes upon a paging request from the mobile switchboard 104, information indicative of extension cancellation (for example, NULL) is written as position registration information, and at the time of a paging response, an extended-position-registration cancel response is returned to the mobile switchboard 104.

Figure 4:
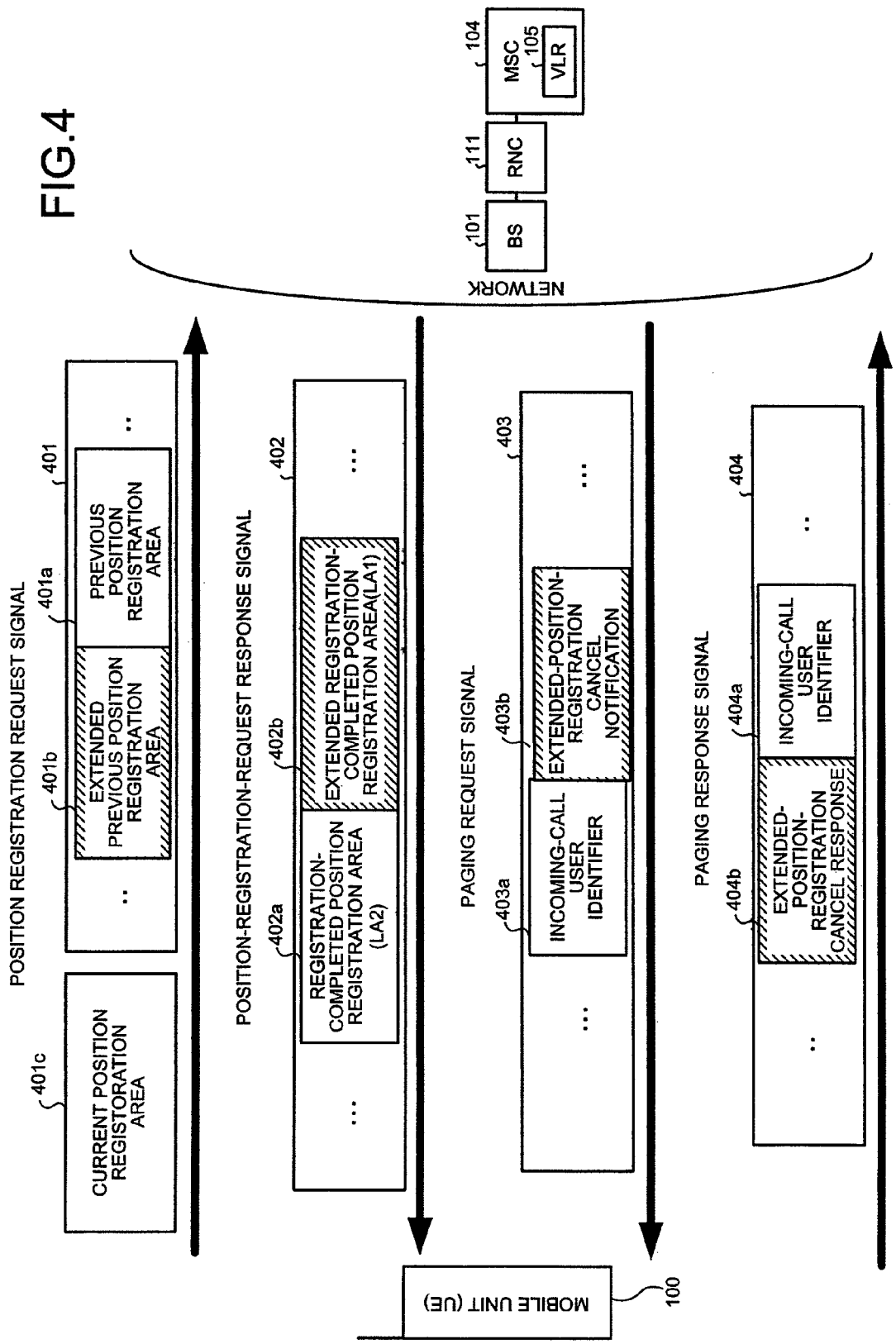
FIG. 4 is a schematic of a signal regarding extension and cancellation of a position registration area.

FIG. 4 is a schematic of a signal regarding extension and cancellation of a position registration area, the signals transmitted and received between the mobile unit and the network (mobile switchboard). From the mobile unit 100 to the network, a position registration request signal 401 and a paging response signal 404 are transmitted. From the network to the mobile unit 100, a position-registration-request response signal 402 and a paging request signal 403 are transmitted. In the drawing, hatched portions represent information extended by the present invention.

The position registration request signal 401 includes information about a previous position registration area 401a and information about an extended previous position registration area 401b. The extended previous position registration area 401b is provided to transmit, from the mobile unit 100 to the network, a list containing the position registration area indicated by the previous position registration area 401a and a position registration area now seemingly forming one position registration area.

Here, the base-station control device 111 at the network side has previously set therein information about a correlation between the cell that received the message from the mobile unit 100 and the position registration area of the cell. The base-station control device 111 adds, to the position registration request signal 401, a current position registration area 401c received from the mobile unit 100, and then transmits the resultant signal.

The position-registration-request response signal 402 includes information about a registration-completed position registration area 402a and information about an extended registration-completed position registration area 402b. The extended registration-completed position registration area 402b is provided to transmit, to the mobile unit 100, a position registration area list containing the position registration area in the registration-completed position registration area 402a determined by the network and the position registration area seemingly forming one position registration area.

The paging request signal 403 includes information about an incoming-call user identifier 403a and information about an extended-position-registration cancel notification 403b. The extended-position-registration cancel notification 403b is provided so that the network side notifies the mobile unit 100 of a notification indicative of a determination that all position registration areas connected for extension are returned to their original state.

The paging response signal 404 includes information about an incoming-call user identifier 404a and information about an extended position-registration cancel response 404b. The extended position-registration cancel response 404b is provided to notify the network side of the fact that the mobile unit 100 has received and identified the extended-position-registration cancel notification 403b set in the paging request signal 403, and then has returned all position registration areas connected for extension to their original state.

As such, all of the above signals, that is, the position registration request signal 401, the position-registration-request response signal 402, the paging request signal 403, and the paging response signal 404, include extended information. The extended information according to the present invention can be used without any problems in the existing position registration scheme in both of the existing (conventional-style) mobile unit 100 and network. For example, as for the information about the extended previous position registration area 401b extended in the position registration request signal 401, in the existing network where this extended information is not considered, the extended portion can be discarded and only the existing information about the previous position registration area 401a is interpreted. Also, as for the information about the extended registration-completed position registration area 402b extended in the position-registration-request response signal 402, in the existing mobile unit 100 where this extended information is not considered, the extended portion can be discarded, and only the existing information about the registration-completed position registration area 402a is interpreted.

Furthermore, as for the information about the extended-position-registration cancel notification 403b extended in the paging request signal 403, in the existing mobile unit 100 where this extended information is not considered, the extended portion can be discarded, and only the existing information about the incoming-call user identifier 403a is interpreted. Here, since the existing mobile unit 100 does not assume, in the first place, extension of a position registration area, the existing mobile unit 100 does not perform a process regarding extension or cancellation of the position registration area. Also as for the information about the extended-position-registration cancel response 404b extended in the paging response signal 404, since the existing mobile unit 100 does not assume, in the first place, extension of a position registration area, the existing mobile unit 100 does not send a response about extension or cancellation of a position registration area. As such, if the present invention is applied to the existing mobile unit 100 and network, neither extension of a position registration area nor cancellation of the extension according to the present invention is performed. Therefore, position registration in the existing scheme can be performed without any trouble.

Figure 5:
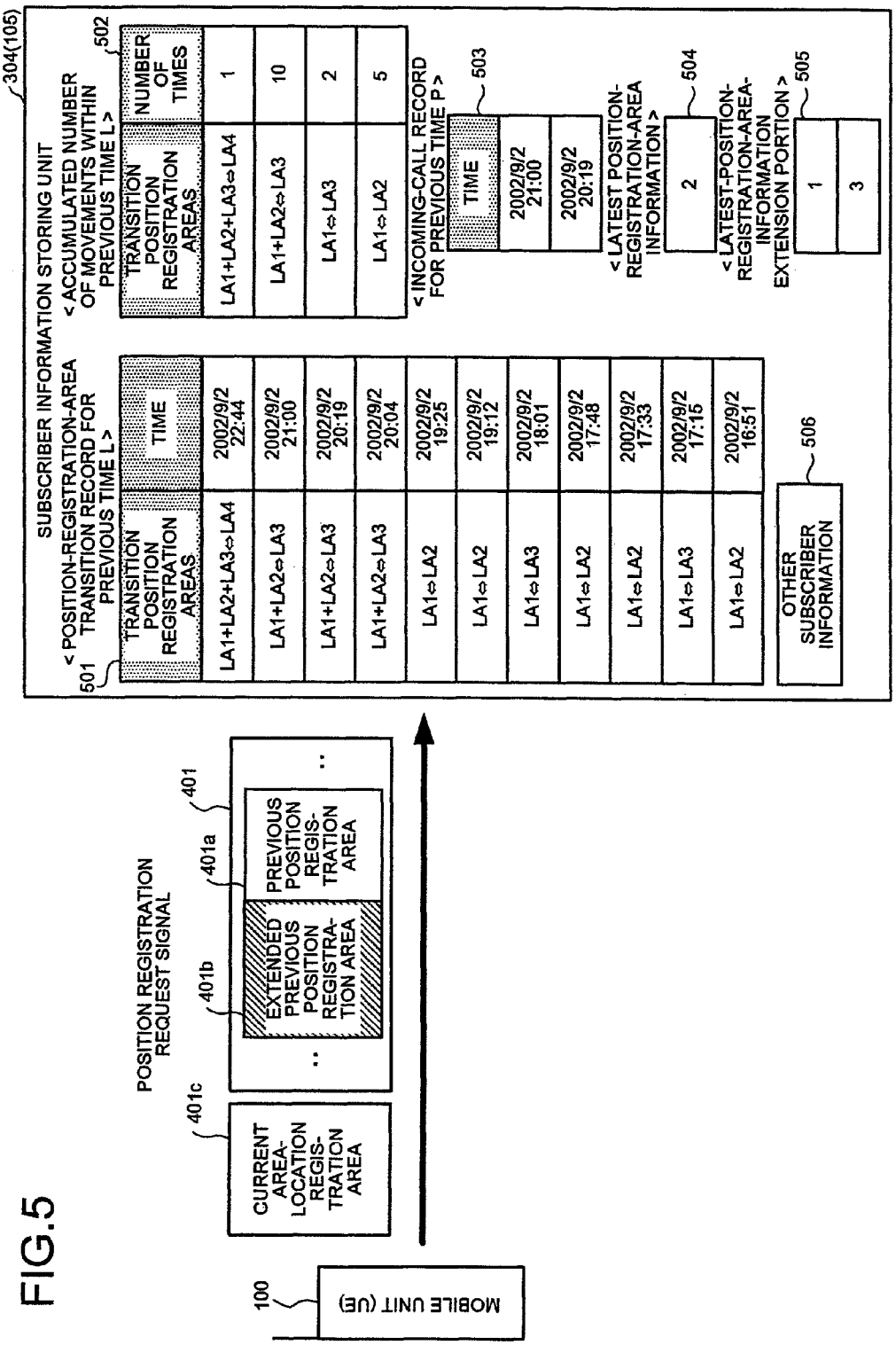
FIG. 5 is a schematic of data regarding position registration areas in a subscriber-information storage unit.

FIG. 5 is a schematic of data regarding position registration areas in a subscriber-information storage unit of the mobile switchboard. In the subscriber-information storage unit 304 (location register 105), various information regarding the position registration area of the mobile unit 100 is stored every time the position registration request signal 401 is transmitted from the mobile unit 100.

The subscriber-information storage unit 304 shown in the drawing is a storage unit provided for each subscriber (user of the mobile unit 100). The information stored in this subscriber-information storage unit 304 relates to the relevant subscriber, and includes a position-registration-area transition record 501 for a previous time period L, an accumulated number of movements 502 for the previous time period L, an incoming-call record 503 for a previous time period P, latest position-registration-area information 504, a latest-position-registration-area information extension portion 505, and other subscriber information 506. As the time periods L and P, arbitrary values (times) are set in advance. The latest position-registration-area information 504 has stored therein the information about the registration-completed position registration area 402a of the position-registration-request response signal 402 to be transmitted to the mobile unit 100. The latest-position-registration-area-information extension portion 505 has stored therein the information about the extended registration-completed position registration area 402b of the position-registration-request response signal 402 to be transmitted to the mobile unit 100.

The mobile unit 100 transmits the position registration request signal 401 to the mobile switchboard 104 at the time of a position registration request. As described above, the position registration request signal 401 include the information about the previous position registration area 401a, the information about the extended previous position registration area 401b, and the information about the current position registration area 401c representing the current position of the mobile unit 100, the information being added by the base-station control device 111.

The position-registration-area transition record 501 for the previous time period L of the subscriber-information storage unit 304 has recorded therein information about all position registration areas across which the mobile unit 100 moved for the previous time period L and times of the movements. The accumulated number of movements 502 for the previous time period L has recorded therein the number of movements the mobile unit 100 made across specific position registration areas for the previous period L. The incoming-call record 503 has recorded therein arrival times of all incoming calls to the mobile unit 100 for the previous time period P (in the example shown in the drawing, two arrival times are recorded). The latest position-registration-area information 504 has stored therein the latest position registration area of the mobile unit 100. The latest-position-registration-area information extension portion 505 has stored therein a list of position registration areas seemingly forming one position registration area together with the position registration area included in the latest position-registration-area information 504.

Figure 6:
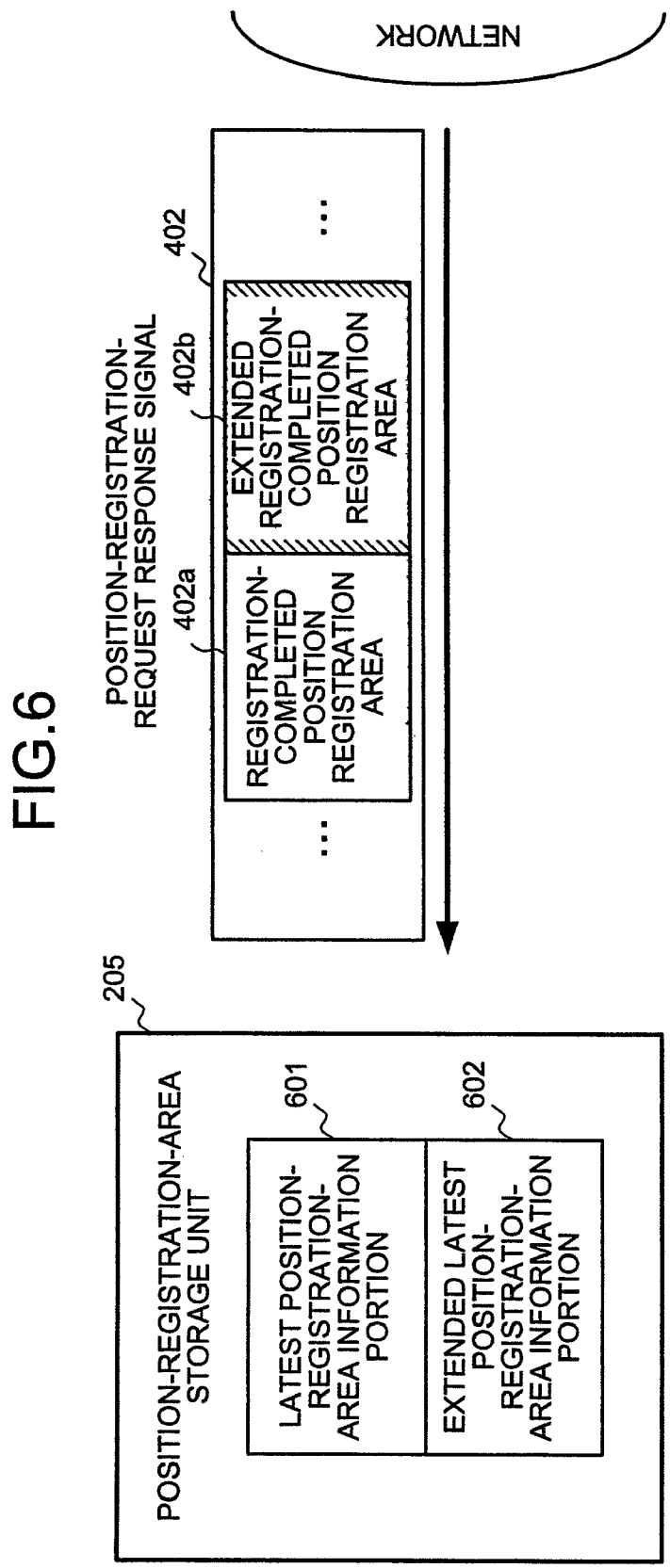
FIG. 6 is a schematic of a position-registration-area storage unit.

FIG. 6 is a schematic of the position-registration-area storage unit provided to the mobile unit. The position-registration-area storage unit 205 includes a latest position-registration-area information portion 601 and an extended latest position-registration-area information portion 602. The position-registration-request respond signal 402 transmitted from the network includes, as described above, information about the registration-completed position registration area 402a and information about the extended registration-completed position registration area 402b, which is extended (added) by the present invention. These pieces of information about the registration-completed position registration area 402a and the extended registration-completed position registration area 402b seemingly form one position registration area.

The latest position-registration-area information portion 601 has stored therein a position registration area of which position registration was completed last, that is, the information about the registration-completed position registration area 402a transmitted from the network. Also, the extended latest position-registration-area information portion 602 has stored therein the information about the extended registration-completed position registration area 402b.

When the mobile unit 100 is present in a position registration area (any one of LA1, LA2, and LA3) in the network, report information transmitted from the network is received at the receiving unit 202 via the antenna 201 (refer to FIG. 2). The signal analyzing unit 204 checks to see whether the current position-registration-area information included in the received report information is included in the latest position-registration-area information portion 601 or the extended latest position-registration-area information portion 602 stored in the position-registration-area storage unit 205 (refer to FIG. 6).

The signal analyzing unit 204 checks the information about the registration-completed position registration area 402a stored in the latest position-registration-area information portion 601 against the extended registration-completed position registration area 402b stored in the extended latest position-registration-area information portion 602. As a result, if the information about the current position registration area received via the report information is not included in the latest position-registration-area information portion 601 or the extended latest position-registration-area information portion 602, the signal analyzing unit 204 instructs the position registration requesting unit 206 to start a position registration process on the network.

The position registration requesting unit 206 extracts the information about the registration-completed position registration area 402a from the latest position-registration-area information portion 601 of the position-registration-area storage unit 205, and then sets the extracted information to the previous position registration area 401a of the position registration request signal 401 (refer to FIG. 5). Also, the position registration requesting unit 206 extracts the information about the extended registration-completed position registration area 402b recorded in the extended latest position-registration-area information portion 602, and then sets the extracted information to the extended previous position registration area 401b. Then, the position registration requesting unit 206 transmits these pieces of information via the transmitting unit 203 and the antenna 201 to the network (base station 101).

On the other hand, when the current position registration area information received via the report information is included in the position-registration-area storage unit 205, the signal analyzing unit 204 determines that no position registration procedure is required, and then ends the processing. Upon completion of the position registration process by the network, the mobile unit 100 receives, at the receiving unit 202 via the antenna 201, the position-registration-request respond signal 402 transmitted from the network. The signal analyzing unit 204 ascertains that position registration has been normally completed, and then stores the information about the registration-completed position registration area 402a included in the position-registration-request respond signal 402 in the latest position-registration-area information portion 601 of the position-registration-area storage unit 205. Then, when the position-registration-request respond signal 402 includes the information about the extended registration-completed position registration area 402b, the extended registration-completed position registration area 402b is written in the extended latest position-registration-area information portion 602. At the time of writing, the entire original information already stored is deleted. As such, upon an instruction from the network, the mobile unit 100 extends the position registration area information stored in the position-registration-area storage unit 205.

The mobile unit 100 receives, at the receiving unit 202 via the antenna 201, the paging request signal 403 transmitted from the network at the time of reception of an incoming call (refer to FIG. 4). When the paging request signal 403 includes the information about the extended-position-registration cancel notification 403b, the signal analyzing unit 204 deletes the entire information recorded in the position-registration-area storage unit 205 (refer to FIG. 2), and then makes an instruction of transmitting a paging response signal 404 (refer to FIG. 4) including the information about the extended-position-registration cancel response 404b to the network from the paging responding unit 207 via the transmitting unit 203 and the antenna 201. In this way, the mobile unit 100 deletes all position registration areas connected for extension (position registration area information) stored in the position-registration-area storage unit 205 upon an instruction from the network.

When receiving the position registration request signal 401 from the mobile unit 100, the mobile switchboard 104 performs a process of extending a position registration area. On the other hand, when an incoming call to the mobile unit 100 is placed, the mobile switchboard 104 performs a process of canceling the extended position registration area.

Figure 7:
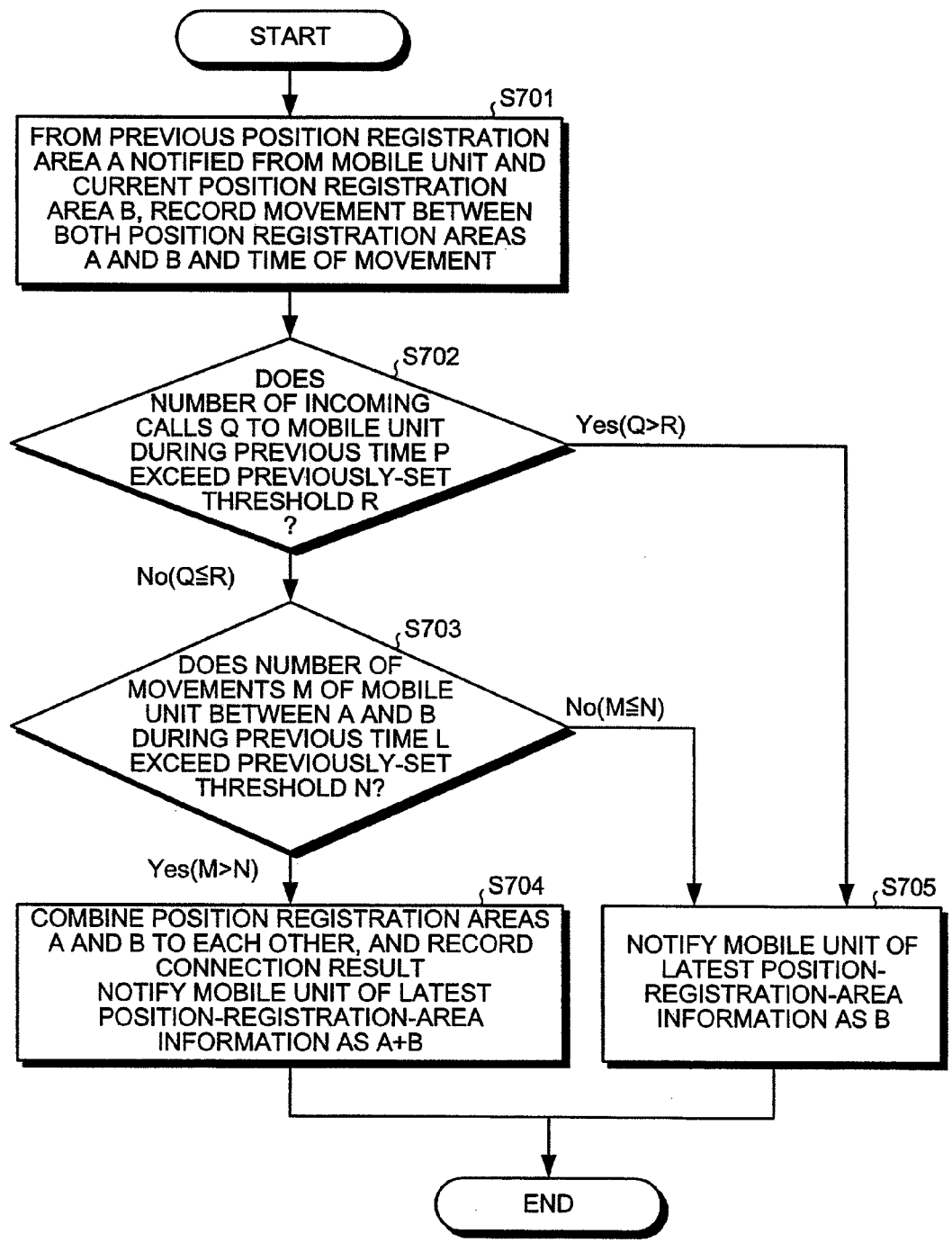
FIG. 7 is a flowchart of operation of the mobile switchboard at a time of extension of a position registration area.

FIG. 7 is a flowchart of the operation of the mobile switchboard at the time of extending a position registration area. When the position registration request signal 401 (refer to FIG. 5) is transmitted from the mobile unit 100, this position registration request signal 401 is then received at the receiving unit 301 of the mobile switchboard 104 via the base station 101 and the base-station control device 111.

With this, the signal analyzing unit 303 of the mobile switchboard 104 records, in the subscriber-information storage unit 304, the fact that the mobile unit 100 moved across the position registration area included in the previous position registration area 401a included in the position registration request signal 401, the seeming position registration area (hereinafter, "a position registration area A") formed with the position registration area included in the extended previous position registration area 401b, and the position registration area (hereinafter referred to as a position registration area B) included in the current position registration area 401c simultaneously transmitted, and also records the time of the movement (step S701).

Specifically, as shown in FIG. 5, the subscriber-information storage unit 304 has recorded therein information about the relevant transition position registration areas and the time of movement as the position-registration-area transition record 501 for the previous time period L. The accumulated number of movements 502 for the previous time period L has recorded therein the relevant transition position registration areas and the accumulated number of movements.

Also, the signal analyzing unit 303 sets the information about the current position registration area 401c included in the position registration request signal 401 to the latest position-registration-area information 504 of the subscriber-information storage unit 304.

Next, it is determined whether the number of incoming calls Q to the mobile unit 100 exceeds a previously-set threshold R (Q>R) during the previous time period P (step S702). This determination is made with reference to the incoming-call record 503 during the previous time period P stored in the subscriber-information storage unit 304. Here, when the number of incoming calls Q to the mobile unit 100 is equal to or smaller than the previously-set threshold R (Q$\leq$R) ("NO" at step S702), it is then determined whether the number of movements M across the position registration area A to which the mobile unit 100 previously moved and the position registration area B where the mobile unit 100 is currently located exceeds a previously-set threshold N (M>N) (step S703).

This determination is made with reference to the accumulated number of movements 502 during the previous time period L stored in the subscriber-information storage unit 304. Here, when the number of movements M of the mobile unit 100 exceeds the previously-set threshold N (M>N) ("YES" at step S703), it is determined that the position registration area A and the position registration area B are to be connected together, and the connection result is then recorded in the subscriber-information storage unit 304 and is also notified to the mobile unit 100 (step S704). Specifically, the position registration area B is recorded in the latest position-registration-area information 504, and the position registration area A to be newly connected is recorded in the latest-position-registration-area information extension portion 505.

Then, the position-registration-request responding unit 305 is instructed to transmit the position-registration-request response signal 402 to the mobile unit 100. The position-registration-request responding unit 305 extracts the information recorded in the latest position-registration-area information 504 and the latest-position-registration-area information extension portion 505 in the subscriber-information storage unit 304. Then, the position registration area B recorded in the latest position-registration-area information 504 is assigned as the information about the registration-completed position registration area 402a of the position-registration-request response signal 402, while the position registration area A recorded in the latest-position-registration-area information extension portion 505 is assigned as the information about the extended registration-completed position registration area 402b.

Thereafter, the position-registration-request response signal 402 is transmitted from the transmitting unit 302 via the base-station control device (RNC) 111 and the base station (BS) 101 to the mobile unit 100 and then the process of extending the position registration area ends. As such, the network extends the seeming position registration area based on the movement record and the incoming-call record of the mobile unit 100.

On the other hand, when, at step S702, the number of incoming calls Q to the mobile unit 100 exceeds the previously-set threshold R (Q>R) ("YES" at step S702) and when, at step S703, the number of movements M of the mobile unit 100 is equal to or smaller than the previously-set threshold N (M≦N) ("NO" at step S703), the latest position-registration-area information is taken as B, which is notified to the mobile unit 100 (step S705), and then the process of extending the position registration area ends.

Figure 8:
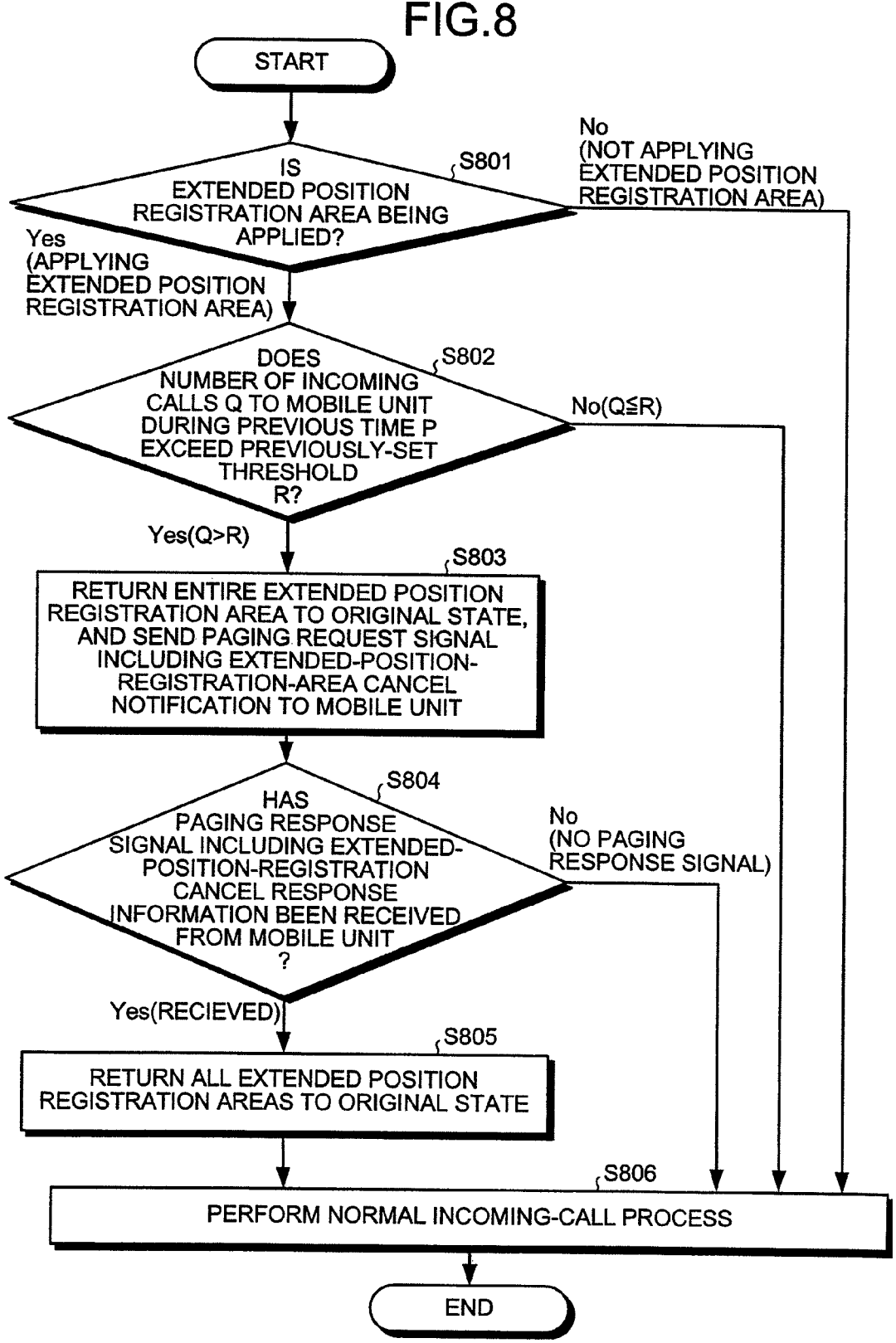
FIG. 8 is a flowchart of operation of the mobile switchboard at a time of canceling the extension of the position registration area.

FIG. 8 is a flowchart of the operation of the mobile switchboard at the time of canceling the extension of the position registration area. When an incoming call is placed to the mobile unit 100 from an external relay network, the receiving unit 301 of the mobile switchboard 104 receives an incoming-call request from the relay network. From the incoming-call request, the signal analyzing unit 303 then ascertains at which subscriber (mobile unit 100) the incoming call is targeted, and then ascertains, from the latest-position-registration-area information extension portion 505 included in the subscriber-information storage unit 304 for the relevant subscriber, whether the extended position registration area is being applied (step S801).

If information has been set in the latest-position-registration-area information extension portion 505, it is determined that the extended position registration area is being applied ("YES" at step S801). It is then determined, with reference to the incoming-call record 503 during the previous time period P for the relevant subscriber, whether the extended position registration area is canceled. It is determined whether the number of incoming calls Q during the previous time period P exceeds the previously-set threshold R (Q>R) (step S802).

Here, when the number of incoming calls Q during the previous time period P exceeds the threshold R (Q>R) ("YES" at step S802), it is determined that all position registration areas connected for extension are returned to their original state to cancel the extended position registration area. Then, the paging request unit 306 sends the paging request signal 403 including the information about the extended-position-registration cancel notification 403b (refer to FIG. 4) from the transmitting unit 302 via the base station (BS) to the mobile unit 100 (step S803).

Thereafter, it is determined whether the paging response signal 404 including the information about the extended position-registration cancel response 404b has been received from the mobile unit 100 (step S804). If the receiving unit 301 has received the paging response signal 404 from the mobile unit 100 and the signal analyzing unit 303 detects that this paging response signal 404 includes the information about the extended position-registration cancel response 404b ("YES" at step S804), all position registration areas connected for extension are returned to their original state (step S805). Specifically, the entire information recorded in the latest-position-registration-area information extension portion 505 of the subscriber-information storage unit 304 is deleted, and then a normal incoming-call process is performed (step S806). In this way, in the network, based on the incoming-call frequency of the mobile unit 100, the extended position registration area is returned to its original state for the mobile unit 100 with a high incoming-call frequency to end the process of canceling the extension of the position registration area.

Here, at step S801 described above, if no information has been set in the latest-position-registration-area information extension portion 505, it is determined that the extended position registration area is not being applied ("NO" at step S801), an a normal incoming-call process is performed (step S806). Similarly, at step S802, if the number of incoming calls Q during the previous time period P is equal to or smaller than the threshold R (Q≦R) ("NO" at step S802) or if the paging response signal 404 from the mobile unit 100 is not received ("NO" at step S804), a normal incoming-call process is then performed (step S806) to end the process of canceling the extension of the position registration area.

In the following description, it is assumed that the subscriber-information storage unit 304 corresponds to the location register 105 having registered therein the position information about the mobile unit 100, and the mobile switchboard 104 accesses the subscriber-information storage unit 304 as the location register 105 to perform extension of a position registration area and cancellation of the extension.

Figure 9:
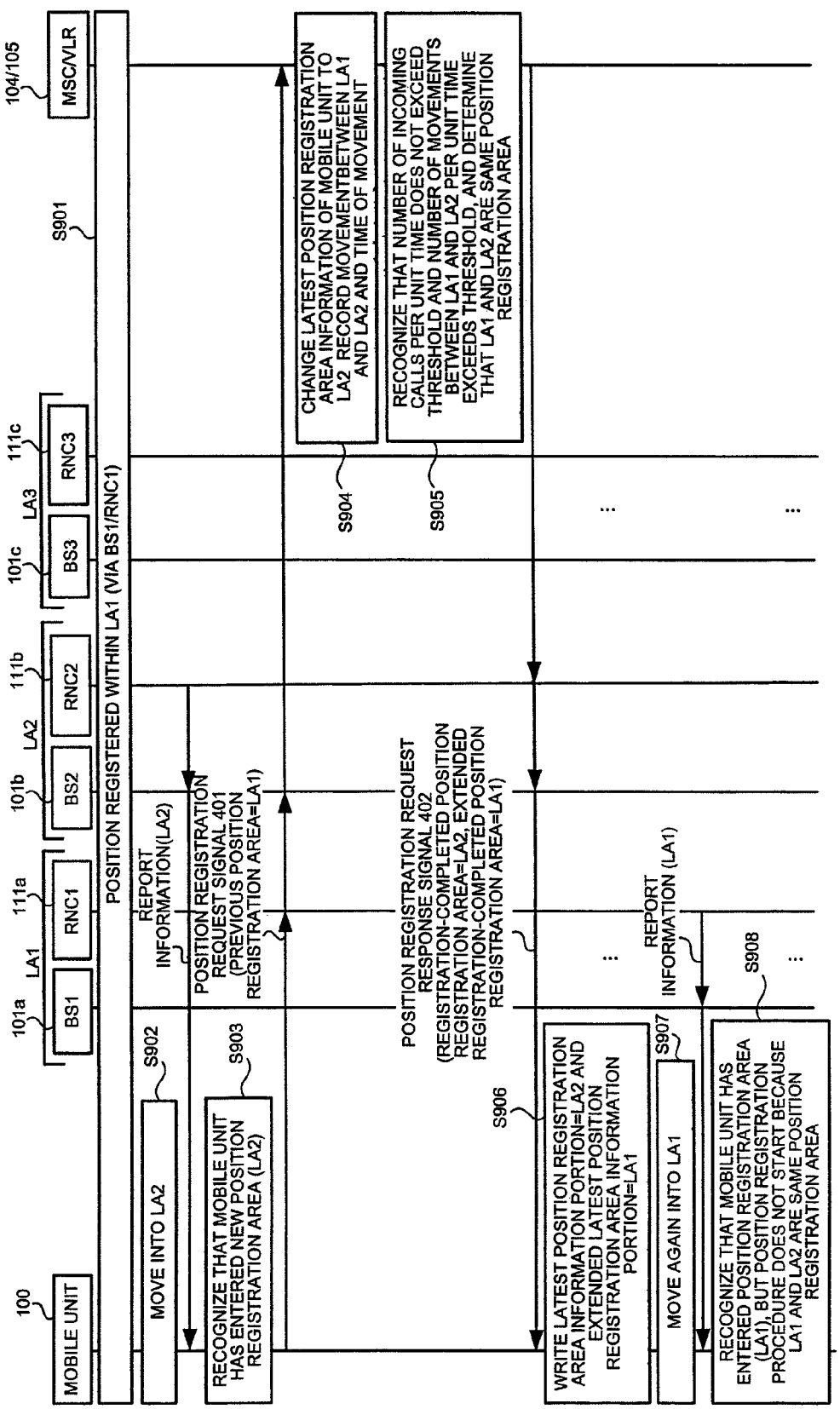
FIG. 9 is a sequence diagram of a procedure for extending a position registration area.

FIG. 9 is a sequence diagram of a procedure for extension a position registration area. The drawing depicts the mobile unit (UE) 100, the base stations (BS1 to BS3) covering the position registration areas (LA1 to LA3), the base-station control devices (RNC1 to RNC3) 111a to 111c, the mobile switchboard (MSC) 104, and the location register (VLR) 105, and also signal exchanges among these units and devices. In the following, the procedure of extending a position registration area when the mobile unit 100 moves is specifically described.

First, it is assumed that the position of the mobile unit 100 has been registered as the position registration area LA1 (step S901). Thereafter, it is assumed that the mobile unit 100 moves into a new position registration area LA2 (step S902). At this time, the mobile unit 100 receives report information (LA2) from the base-station control device (RNC2) 111*b* of the position registration area LA2 via the base station (BS2) 101*b*.

Based on this report information, the mobile unit 100 ascertains to have entered the new position registration area (LA2) (step S903), and then transmits the position registration request signal 401 shown in FIG. 5. The information about the previous position registration area 401*a* in this position registration request signal 401 indicates the previous registration area LA1. This position registration request signal 401 is sent from the base station (BS2) 101*b* in the position registration area LA2 via the base-station control device (RNC2) 111*b* to the mobile switchboard (MSC) 104.

Upon reception of the position registration request signal 401, the subscriber-information storage unit 304 (location register 105) in the mobile switchboard (MSC) 104 changes the latest position-registration-area information 504 of the mobile unit 100 in the subscriber-information storage unit 304 shown in FIG. 5 to LA2. Also, a movement between the position registration areas LA1 and LA2 is recorded with the time of the movement in the position-registration-area transition record 501 for the previous time period L (step S904).

Next, it is determined with reference to the incoming-call record 503 to the mobile unit 100 for the previous time period P whether it is satisfied that the number of incoming calls Q per unit time does not exceed the threshold R (corresponding to "NO" at step S702 in FIG. 7) and also it is determined with reference to the accumulated number of movements 502 for the previous time period L whether it is satisfied that the number of movements M between the position registration areas LA1 and LA2 per unit time exceeds the threshold N (corresponding to "YES" at step S703 in FIG. 17). If both are satisfied, it is determined that the position registration areas LA1 and LA2 are taken as the same single position registration area (LA1+LA2) (step S905).

At this time, the latest position-registration-area information 504 in the subscriber-information storage unit 304 has recorded therein LA2, while the latest-position-registration-area information extension portion 505 has recorded therein LA1. Then, the mobile switchboard 104 transmits the position-registration-request response signal 402 shown in FIG. 6 to the mobile unit 100. As the information about the registration-completed position registration area 402*a* of the position-registration-request response signal 402, LA2 recorded in the latest position-registration-area information 504 is set. As the information about the extended registration-completed position registration area 402*b*, LA1 recorded in the latest-position-registration-area information extension portion 505 is set. This position-registration-request response signal 402 is transmitted from the base-station control device (RNC2) 111*b* in the position registration area LA2 via the base station (BS2) 101*b* to the mobile unit 100.

Upon reception of this position-registration-request response signal 402, the mobile unit 100 writes LA2, which is the information about the registration-completed position registration area 402*a*, in the latest position-registration-area information portion 601 of the position-registration-area storage unit 205. Also, the mobile unit 100 writes LA1, which is the information about the extended registration-completed position registration area 402*b*, in the extended latest position-registration-area information portion 602 (step S906).

Thereafter, it is assumed that the mobile unit 100 moves again to the position registration area LA1 (step S907). At this time, the mobile unit 100 receives report information (LA1) from the base-station control device (RNC1) 111*a* of the position registration area LA1 via the base station (BS1) 101*a*. Based on this report information, the mobile unit 100 ascertains to have entered the position registration area (LA1). At this time, the position-registration-area storage unit 205 of the mobile unit 100 has already written LA2 in the latest position-registration-area information portion 601 and LA1 in the extended latest position-registration-area information portion 602. That is, the mobile unit 100 determines that a movement within such an extended position registration area LA1+LA2 is taken as a movement within the same position registration area, and does not start a position registration procedure (step S908).

Figure 10:
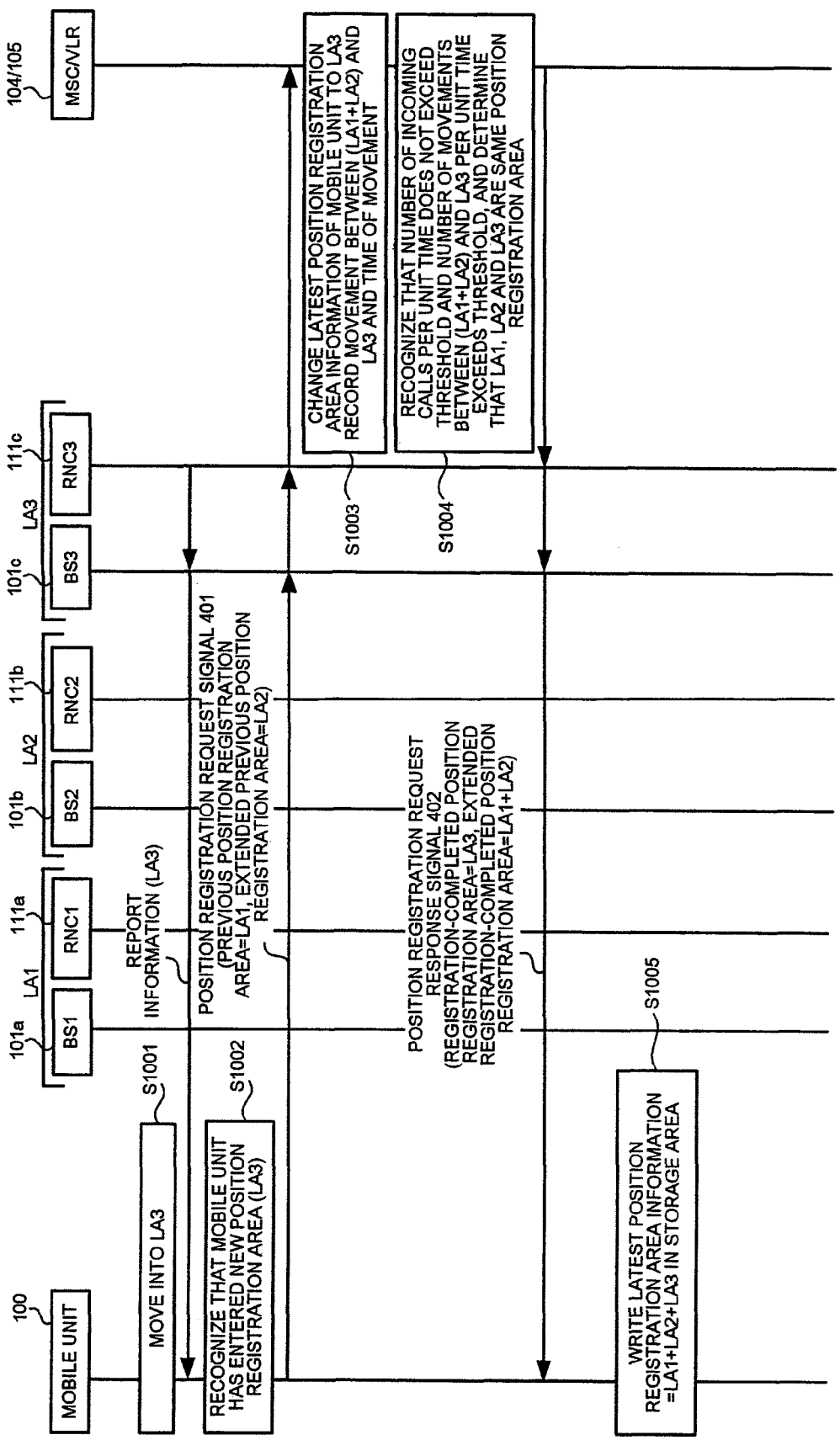
FIG. 10 is a sequence diagram of a procedure for further extending the position registration area.

Next, FIG. 10 is a sequence diagram of a procedure further extending the position registration area. In the following, the procedure of further extending the extended position registration area shown in FIG. 9 is described.

Position registration of the mobile unit 100 has been made such that the mobile unit 100 is located in the extended position registration area LA1+LA2. Then, it is assumed that the mobile unit 100 moves into another new position registration area LA3 (step S1001). At this time, the mobile unit 100 receives report information (LA3) from the base-station control device (RNC3) 111*c* of the position registration area LA3 via the base station (BS3) 101*c*.

Based on the report information, the mobile unit 100 ascertains to have entered the new position registration area (LA3) (step S1002), and then transmits the position registration request signal 401 shown in FIG. 5. The information about the previous position registration area 401*a* of the position registration request signal 401 indicates the previous position registration area LA2, and the information about the extended previous position registration area 401*b* indicates LA1. This position registration request signal 401 is sent from the base station (BS3) 101*c* of the position registration area LA3 via the base-station control device (RNC3) 111*c* to the mobile switchboard (MSC) 104.

Upon reception of the position registration request signal 401, the subscriber-information storage unit 304 in the mobile switchboard (MSC) 104 changes the latest position-registration-area information 504 of the mobile unit 100 to LA3. Also, in the position-registration-area transition record 501 for the previous time period L, a movement between the position registration areas (LA1+LA2) and LA3 is recorded together with a time of movement (step S1003).

Next, it is determined with reference to the incoming-call record 503 to the mobile unit 100 for the previous time period P whether it is satisfied that the number of incoming calls Q per unit time does not exceed the threshold R (corresponding to "NO" at step S702 in FIG. 7) and also it is determined with reference to the accumulated number of movements 502 for the previous time period L whether it is satisfied that the number of movements M between the position registration areas (LA1+LA2) and LA3 per unit time exceeds the threshold N (corresponding to "YES" at step S403 in FIG. 7). If both are satisfied, it is determined that the position registration areas LA1+LA2 and LA3 are taken as the same single position registration area (LA1+LA2+LA3) (step S1004).

At this time, the latest position-registration-area information 504 in the subscriber-information storage unit 304 has recorded therein LA3, while the latest-position-registration-area information extension portion 505 has recorded therein LA1 and LA2. Then, the mobile switchboard 104 transmits the position-registration-request response signal 402 shown in FIG. 6 to the mobile unit 100. As the information about the registration-completed position registration area 402*a* of the position-registration-request response signal 402, LA3 recorded in the latest position-registration-area information 504 is set. As the information about the extended registration-completed position registration area 402*b*, LA1+LA2 recorded in the latest-position-registration-area information extension portion 505 is set. This position-registration-request response signal 402 is transmitted from the base-station control device (RNC3) 111c in the position registration area LA3 via the base station (BS3) 101c to the mobile unit 100.

Upon reception of this position-registration-request response signal 402, the mobile unit 100 writes LA3, which is the information about the registration-completed position registration area 402a, in the latest position-registration-area information portion 601 of the position-registration-area storage unit 205. Also, the mobile unit 100 writes (LA1+LA2), which is the information about the extended registration-completed position registration area 402b, in the extended latest position-registration-area information portion 602 (step S1005).

According to the above procedure, every time the frequency at which the mobile unit 100 with a low incoming-call frequency moves across different position registration areas exceeds the previously-set threshold, these different position registration areas are connected. Then, as long as the mobile unit 100 moves within the newly-extended position registration area, the mobile unit 100 does not perform a position registration procedure. As such, the mobile unit 100 with a higher movement frequency and a lower incoming-call frequency has a further-extended position registration area. Thus, a ratio at which such a mobile unit 100 is currently registered as being located in the extended position registration area is increased every time the mobile unit 100 moves across the position registration areas. Therefore, the number of times of starting a position registration procedure can be reduced, thereby avoiding wasted transmission and reception between the mobile unit 100 and the network regarding position registration and achieving efficient use of wireless resources.

Figure 11:
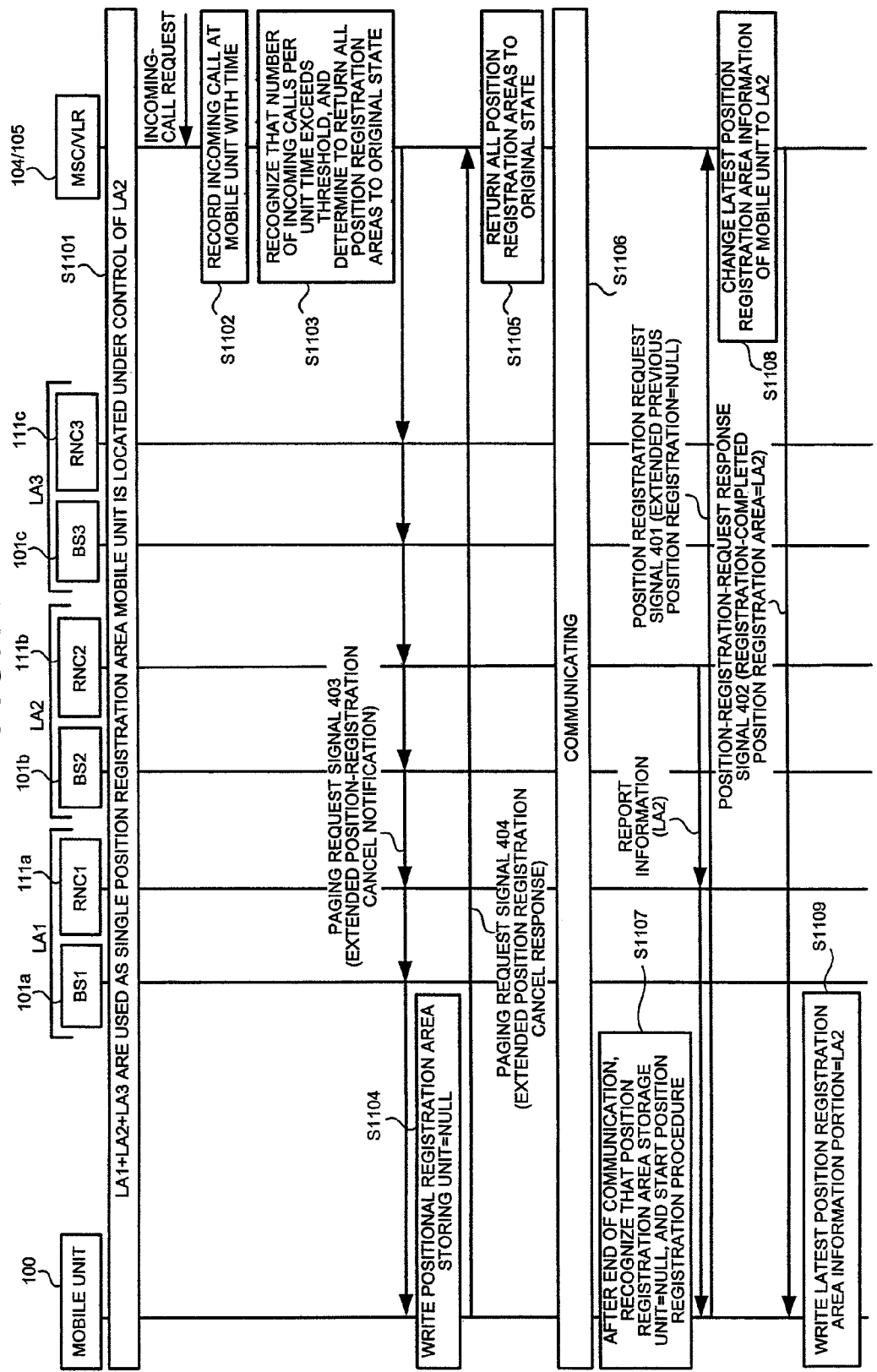
FIG. 11 is a sequence diagram of a procedure for canceling the extension of the position registration area.

Next, the entire procedure regarding cancellation of the extension of the position registration area described above is described. FIG. 11 is a sequence diagram of a procedure of canceling the extension of the position registration area shown in FIG. 5. In the following, the procedure of canceling the extension of the position registration area in the extended state shown in FIG. 10 is described.

The mobile unit 100 uses the position registration areas LA1+LA2+LA3 as a single extended position registration area. Also, it is assumed that the mobile unit 100 is under the control of the position registration area LA2 (step S1101). When an incoming-call request to the mobile unit 100 is placed, the mobile switchboard 104 records, in the incoming-call record 503 for the previous time period P of the subscriber-information storage unit 304, that an incoming call is placed, and the time of the incoming call (step S1102). Also, with reference to the incoming-call record 503 for the previous time period P, it is determined whether the number of incoming calls Q to the mobile unit 100 for a predetermined time period exceeds the previously-set threshold R (corresponding to step S802 of FIG. 8). If the number exceeds the threshold, the mobile switchboard 104 determines to return all position registration areas including the extended position registration area to their original state (step S1103).

Then, the mobile switchboard 104 starts a paging procedure on all the position registration areas connected for extension (LA1, LA2, and LA3). The mobile switchboard 104 causes the information about the extended-position-registration cancel notification 403b to be included in the paging request signal 403 (refer to FIG. 4) for transmission to the mobile unit 100. With this extended-position-registration cancel notification 403b, the mobile unit 100 is notified that all position registration areas have been returned to their original states.

Upon reception of this information, the mobile unit 100 writes information indicative of cancellation of the extension (for example, NULL) in the latest position-registration-area information portion 601 and the extended latest position-registration-area information portion 602 of the position-registration-area storage unit 205 (step S1104). The mobile unit 100 then causes the information about the extended position-registration cancel response 404b to be included in the paging response signal 404 (refer to FIG. 4), and notifies the mobile switchboard 104 that the information about the extended-position-registration cancel notification 403b has been normally received.

Thereafter, the mobile switchboard 104 receives the paging response signal 404 including the information about the extended position-registration cancel response 404b, thereby deleting the information regarding all position registration areas for the mobile unit 100 and returning the position registration areas connected for extension to their original state (step S1105). Specifically, the latest position-registration-area information 504 and the information stored in the latest-position-registration-area information extension portion 505 of the subscriber-information storage unit 304 are deleted. In this state, the mobile unit 100 receives the incoming call and enters a communicating state (step S1106).

After the end of communication, based on the fact that the latest position registration area stored in the mobile unit 100 is in an extension-cancelled state (NULL), the mobile unit 100 ascertains that no position registration is currently made on the network, and then newly starts a position registration procedure (step S1107). At this time, since the mobile unit 100 is located in the position registration area LA2, the mobile unit 100 receives report information (LA2) from the relevant base-station control device (RNC2) 111b via the base station (BS2) 101b. Based on this report information, the mobile unit 100 ascertains that the current position registration area is LA2, and then transmits the position registration request signal 401 (refer to FIG. 5). At this time, the information about the previous position registration area 401a and the information about the extended previous position registration area 401b of the position registration request signal 401 are both NULL.

Upon reception of the position registration request signal 401, the mobile switchboard 104 performs a normal position registration procedure, and then changes the latest position-registration-area information 504 of the mobile unit 100 in the subscriber-information storage unit 304 to LA2 (step S1108). The mobile switchboard 104 then transmits the position-registration-request response signal 402 shown in FIG. 6 to the mobile unit 100. As the information about the registration-completed position registration area 402a of the position-registration-request response signal 402, LA2 recorded in the latest-position-registration-area information 504 is set. The mobile unit 100 then writes LA2 as the latest position registration area in the latest-position-registration-area information portion 601 of the position-registration-area storage unit 205 (step S1109).

In this way, the position registration areas connected for extension can be cleared, that is, returned to their original state, when the frequency of incoming calls to the mobile unit 100 exceeds the previously-set threshold. That is, for the mobile unit 100 with a high incoming-call frequency, the extension of the position registration area is cancelled. Therefore, it is possible at the time of incoming calls to the mobile unit 100 to avoid an increase in the number of paging signals transmitted from base stations (BS) of a plurality of position registration areas to the mobile unit 100. This can reduce a communication load on the network, thereby making it possible to efficiently use wireless resources.

In the foregoing, the present invention is not restricted to the embodiment described above, but can be variously modified. For example, at the time of canceling the extension of the position registration area, the mobile unit 100 may not clear the information about the position registration areas stored in the latest position-registration-area information portion 601 shown in FIG. 6, but may clear only the information about the extended position registration area stored in the extended latest position-registration-area information portion 602. If it is determined whether the position registration area where the mobile unit 100 is located at the time of clearing is identical to the position registration area recorded in the latest position-registration-area information portion 601 and the determination indicates that they are identical to each other, the position registration request signal does not have to be sent to the network, thereby achieving more efficient use of wireless resources.

Also, the method of extending a position registration area and canceling the extension described above can be achieved by executing a previously-provided program on a computer, such as a personal computer or a work station. This program is recorded on any one of various recording medium, and is executed by being read by the computer from the computer. Also, this program may be a transmission medium distributable via a network, such as the Internet.

As has been described in the foregoing, according to the present invention, an optimum position registration area can be set according to the movement state of the mobile unit. Also, as for a mobile unit having a low incoming-call frequency and frequently moving among position registration areas, a plurality of position registration areas are connected together, thereby reducing a frequency of requesting position registration from the mobile unit to the network. Furthermore, as for a mobile unit having a high incoming-call frequency, the connection of the position registration areas is cancelled at the time of incoming calls, thereby preventing unconditional extension of the position registration area and avoiding an increase in the number of paging signals to be transmitted from the network at the time of incoming calls. Therefore, an effect can be achieved such that a communication load on the network can be reduced and wireless resources can be efficiently used.

According to the present invention, it is possible to reduce a communication load to a network, thereby efficiently using wireless resources in the network.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mobile communication system comprising:
   a mobile station that executes, in response to a change in receiving area information, an update request regarding area information; and
   a base station that transmits the area information, wherein the base station includes a transmitting unit that transmits, to the mobile station, area list information that is able to include information concerning a plurality of areas including a registration-completed position registration area and an extended registration-completed position registration area, and
   the mobile station includes
   a receiving unit that receives the area list information, and
   a signal analyzing unit that controls execution of the update request such that the update request is not executed when the receiving-area information that has changed is included in the extended registration-completed position registration area of the area list information.

2. An area information updating method for a mobile communication system including a mobile station that executes, in response to a change in receiving-area information, an update request regarding area information, and a base station that transmits the area information, the area information updating method comprising:
   transmitting, from the base station to the mobile station, area list information that is able to include information concerning a plurality of areas including a registration-completed position registration area and an extended registration-completed position registration area;
   receiving the area list information at the mobile station; and
   controlling, at the mobile station, execution of the update request such that the update request is not executed when the receiving-area information that has changed is included in the extended registration-completed position registration area of the area list information.

3. A mobile station that executes, in response to a change in receiving-area information, an update request regarding area information, the mobile station comprising:
   a receiving unit that receives, through a base station, area list information that is able to include information concerning a plurality of areas including a registration-completed position registration area and an extended registration-completed position registration area,
   a storage unit that stores the received area list information; and
   a signal analyzing unit that controls execution of the update request such that the update is not executed when the receiving-area information that has changed is included in the extended registration-completed position registration area of the area list information stored in the storage unit.

4. A storage apparatus of a mobile communication system including a mobile station that executes, in response to a change in receiving-area information, an update request regarding area information, and a base station that transmits the area information, the storage apparatus storing the area information that is transmitted in reply to the update request and concerns the mobile station, and comprising:
   a storage unit that stores, corresponding to the mobile station, area list information that is able to include information concerning a plurality of areas including a registration-completed position registration area and an extended registration-completed position registration area, the area list information being transmitted to the mobile station that controls execution of the update request such that the update request is not executed when the receiving-area information that has changed is included in the extended registration-completed position registration area of the area list information, wherein
   paging is executed according to the area list information stored in the storage unit when there is an incoming call for the mobile station.

5. A mobile communication system comprising:
   a mobile station that executes, in response to a change in receiving-area information, an update request regarding area information;

a base station that transmits the area information; and
a storage unit that stores, corresponding to the mobile station, area information referenced upon execution of paging when there is an incoming call to the mobile station, wherein
the base station includes a transmitting unit that transmits, to the mobile station, area list information that is able to include information concerning a plurality of areas including a registration-completed position registration area and an extended registration-completed position registration area, and
the mobile station includes
a receiving unit that receives the area list information, and
a transmitting unit that transmits, upon execution of the update request, information including area information including the registration-completed position registration area and the extended registration-completed position registration area included in the area list information.

6. An area information updating method for a mobile communication system including a mobile station that executes, in response to a change in receiving-area information, an update request regarding area information; a base station that transmits the area information; and a storage unit that stores, corresponding to the mobile station, area information referenced upon execution of paging when there is an incoming call to the mobile station; the area information updating method comprising:
transmitting, from the base station to the mobile station, area list information that is able to include information concerning a plurality of areas including a registration-completed position registration area and an extended registration-completed position registration area;
receiving, at the mobile station, the area list information; and
transmitting from the mobile station, upon execution of the update request, information including area information including the registration-completed position registration area and the extended registration-completed position registration area that are included in the area list information.

7. A mobile station that executes, in response to a change in receiving-area information, an update request regarding area information and that is utilized in a mobile communication system including a base station that transmits the area information and a storage unit that stores, corresponding to the mobile station, area information referenced upon execution of paging when there is an incoming call to the mobile station, the mobile station comprising:
a receiving unit that receives area list information that is able to include information concerning a plurality of areas including a registration-completed position registration area and an extended registration-completed position registration area; and
a transmitting unit that transmits, upon execution of the update request, information including area information including the registration-completed position registration area and the extended registration-completed position registration area that are included in the area list information.

8. A mobile communication system comprising:
a mobile station that executes, in response to a change in receiving-area information, an update request regarding area information; and
a base station that transmits the area information, wherein
the base station includes a transmitting unit that transmits, to the mobile station, area list information that is able to include information concerning a plurality of areas including a registration-completed position registration area and an extended registration-completed position registration area, and
the mobile station includes
a receiving unit that receives the area list information, and
a signal analyzing unit that executes the update request based on the received area list information, and invalidates existing area list information upon receipt of new area list information including a registration-completed position registration area and an extended registration-completed position registration area by the receiving unit.

9. An area information updating method for a mobile communication system including a mobile station that executes, in response to a change in receiving-area information, an update request regarding area information, and a base station that transmits the area information, the area information updating method comprising:
transmitting, from the base station to the mobile station, area list information that is able to include information concerning a plurality of areas including a registration-completed position registration area and an extended registration-completed position registration area;
receiving, at the mobile station, the area list information;
executing, at the mobile station, the update request based on the area list information received at the receiving; and
invalidating, at the mobile station, existing area list information upon receipt of new area list information including a registration-completed position registration area and an extended registration-completed position registration area.

10. A mobile station that, in response to a change in area information, executes an update request for the area information, the mobile station comprising:
a receiving unit that receives, through a base station, area list information that is able to include information concerning a plurality of areas including a registration-completed position registration area and an extended registration-completed position registration area;
a storage unit that stores the received area list information; and
a signal analyzing unit that executes the update request based on the received area list information, and invalidates existing area list information upon receipt of new area list information including a registration-completed position registration area and an extended registration-completed position registration area by the receiving unit.

11. A mobile communication system comprising:
a mobile station that executes, in response to a change in receiving-area information, an update request regarding area information; and
a base station that transmits the area information, wherein
the base station includes a transmitting unit that transmits, to the mobile station, area list information that is able to include information concerning a plurality of areas including a registration-completed position registration area and an extended registration-completed position registration area, and
the mobile station includes
a receiving unit that receives the area list information, and
a signal analyzing unit that executes the update request based on the received area list information, and invalidates existing area list information upon receipt of a predefined message by the receiving unit.

12. An area information updating method for a mobile communication system including a mobile station that executes, in response to a change in receiving-area information, an update request regarding area information, and a base station that transmits the area information, the area information updating method comprising:

transmitting, from the base station to the mobile station, area list information that is able to include information concerning a plurality of areas including a registration-completed position registration area and an extended registration-completed position registration area;

receiving, at the mobile station, the area list information;

executing, at the mobile station, the update request based on the received area list information; and invalidating, at the mobile station, existing area list information upon receipt of a predefined message.

13. A mobile station that executes, in response to a change in receiving-area information, an update request regarding area information and that is utilized in a communication system including a base station that transmits the area information, the mobile station comprising:

a receiving unit that receives, from the base station, area list information that is able to include information concerning a plurality of areas including a registration-completed position registration area and an extended registration-completed position registration area; and a signal analyzing unit that executes the update request based on the received area list information, and invalidates existing area list information upon receipt of a predefined message by the receiving unit.

14. A mobile communication system comprising:

a mobile station that executes, in response to a change in receiving-area information, an update request regarding area information;

a plurality of base stations that transmit the area information;

a storage unit that stores, corresponding to the mobile station, area information referenced upon execution of paging processing in response to an incoming to the mobile station; and a transmitting unit that, when area list information including information concerning a plurality of areas including a registration-completed position registration area and an extended registration-completed position registration area is stored in the storage unit, transmits area information included in the area list information and a signal for executing paging from the base stations that transmit area information differing from the area information transmitted, wherein the mobile station includes a receiving unit that receives the signal for executing paging from any of the base stations.

15. A paging method for a mobile communication system including a mobile station that executes, in response to a change in receiving-area information, an update request regarding area information; a plurality of base stations that transmit the area information; and a storage unit that stores, corresponding to the mobile station, area information referenced upon execution of paging processing in response to an incoming to the mobile station; the paging method comprising:

transmitting, when area list information including information concerning a plurality of areas including a registration-completed position registration area and an extended registration-completed position registration area is stored in the storage unit, area information included in the area list information; and transmitting a signal for executing paging from the base stations that transmit area information differing from the area information transmitted at the transmitting the area information wherein the signal for executing paging from any of the base stations is received at the mobile station.

16. A mobile station that executes, in response to a change in receiving-area information, an update request regarding area information and that is utilized in a communication system including a base station that transmits the area information and a storage unit that stores, corresponding to the mobile station, area information referenced upon execution of paging processing in response to an incoming to the mobile station, the mobile station comprising:

a receiving unit that receives a signal for executing paging from any of the base stations that transmit area information differing from the area information that is included in the area list information and transmitted when the area list information including information concerning a plurality of areas including a registration-completed position registration area and an extended registration-completed position registration area is stored in the storage unit; and a transmitting unit that transmits an acknowledgement signal in reply to the signal for executing paging received at the receiving unit.

* * * * *